(12) United States Patent
Tseng

(10) Patent No.: US 11,894,718 B2
(45) Date of Patent: Feb. 6, 2024

(54) POWER SYSTEM

(71) Applicant: Ting-Jung Tseng, Taoyuan (TW)

(72) Inventor: Ting-Jung Tseng, Taoyuan (TW)

( * ) Notice: Subject to any disclaimer, the term of this patent is extended or adjusted under 35 U.S.C. 154(b) by 56 days.

(21) Appl. No.: 17/894,253

(22) Filed: Aug. 24, 2022

(65) Prior Publication Data

US 2023/0130597 A1 Apr. 27, 2023

Related U.S. Application Data

(63) Continuation-in-part of application No. 17/509,208, filed on Oct. 25, 2021, now abandoned.

(51) Int. Cl.
| | |
|---|---|
| *H02J 9/06* | (2006.01) |
| *H02K 7/08* | (2006.01) |
| *H02K 7/02* | (2006.01) |
| *H02J 15/00* | (2006.01) |

(52) U.S. Cl.
CPC ............ *H02J 9/061* (2013.01); *H02J 15/007* (2020.01); *H02K 7/025* (2013.01); *H02K 7/08* (2013.01)

(58) Field of Classification Search
CPC ........ H02J 9/061; H02J 15/007; H02K 7/025; H02K 7/08
See application file for complete search history.

(56) References Cited

U.S. PATENT DOCUMENTS

2003/0137196 A1* 7/2003 Liran .................... H02K 7/025
307/64

* cited by examiner

*Primary Examiner* — Viet P Nguyen
(74) *Attorney, Agent, or Firm* — Best & Flanagan LLP

(57) ABSTRACT

A power system includes a base, two magnetic bearings mounted on the base, a shaft rotatably mounted on the two magnetic bearings, a flywheel mounted on the shaft, a motor connected with the flywheel, an uninterrupted power supply electrically connected with the motor, a utility power electrically connected with the uninterrupted power supply, a coupling connected with the shaft, a speed change device connected with the coupling, a generating device connected with the speed change device, a load electrically connected with the generating device, a recharge rectifier electrically connected with the uninterrupted power supply, and a reactor electrically connected with the recharge rectifier and the generating device. Thus, the enlarged torque of the flywheel provides the inertia power to enhance the generating power of the generating device.

3 Claims, 2 Drawing Sheets

POWER SYSTEM

CROSS-REFERENCES TO RELATED APPLICATIONS

The present invention is a continuation-in-part (C.I.P.) application of the co-pending U.S. Ser. No. 17/509,208, filed on Oct. 25, 2021.

BACKGROUND OF THE INVENTION

1. Field of the Invention

The present invention relates to a power system and, more particularly, to a power system that generates an electric energy by an inertia power.

2. Description of the Related Art

In recent years, the energy policies of most of the countries on the earth are established to save the required energy and to reduce the carbon emission, so as to solve the increasingly serious problem of global warming and to achieve the purpose of environmental protection. Thus, it is necessary to reduce the use of coal and coal products, and to reduce the use of crude oil and petroleum products, so as to reduce the carbon dioxide emissions. In addition, it is popular to use the green energy for generating and providing an electric power to a load, such as a motorized vehicle or power machinery, thereby preventing from causing an air pollution or preventing the environment from being damaged. However, the generating device using the green energy is not operated steadily, stably, and successively, thereby decreasing the efficiency of generating electricity.

BRIEF SUMMARY OF THE INVENTION

The primary objective of the present invention is to provide a power system that generates an electric energy by aid of an inertia power.

In accordance with the present invention, there is provided a power system comprising a base, two magnetic bearings mounted on the base, a shaft rotatably mounted on the two magnetic bearings, a flywheel mounted on the shaft, a motor connected with the flywheel, an uninterrupted power supply electrically connected with the motor, a utility power electrically connected with the uninterrupted power supply, a coupling connected with the shaft, a speed change device connected with the coupling, a generating device connected with the speed change device, a load electrically connected with the generating device, a recharge rectifier electrically connected with the uninterrupted power supply, and a reactor electrically connected with the recharge rectifier and the generating device. The uninterrupted power supply provides an electric power to the motor. The motor drives and rotates the flywheel successively. The flywheel has a periphery provided with a conic portion. The conic portion of the flywheel has a dimension reduced from a center toward two sides of the conic portion symmetrically. The flywheel has an interior provided with two concave portions which are arranged symmetrically. The flywheel is provided with a fixed portion secured on the shaft. The fixed portion of the flywheel is arranged between the two concave portions. The fixed portion of the flywheel has a center provided with a through hole allowing passage of the shaft. The shaft is rotated successively by the inertia force produced by the flywheel. The power system further comprises two fastening members mounted on the fixed portion of the flywheel and secured on the shaft to secure the fixed portion of the flywheel to the shaft. The recharge rectifier delivers an electric energy from the generating device into the uninterrupted power supply so that the uninterrupted power supply provides the electric power to the motor for rotating the flywheel.

According to the primary advantage of the present invention, the enlarged torque of the flywheel provides the inertia power to enhance the generating power of the generating device so that the electric energy of the generating device is supplied to and used by the load. In addition, the uninterrupted power supply cooperates with the utility power to provide the electric power to the motor for rotating the flywheel and the shaft so that the load is operated successively.

According to another advantage of the present invention, the power system provides an electric energy to drive the motor which cooperates with the inertia power from the flywheel to generate en electric power.

According to a further advantage of the present invention, the power system uses an inertia force to generate and provide an electric energy to the load so that the electric energy is clean, successive, and steady without causing any pollution.

According to a further advantage of the present invention, the recharge rectifier delivers and feeds the electric energy from the generating device into the uninterrupted power supply so that the uninterrupted power supply provides the electric power to the motor for rotating the flywheel and the shaft to keep the power system operating successively.

According to a further advantage of the present invention, the power system achieves an energy-saving purpose.

According to a further advantage of the present invention, the utility power provides an auxiliary power to the uninterrupted power supply when the electric power of the uninterrupted power supply is not enough or exhausted so that the uninterrupted power supply provides the electric power to the motor steadily and constantly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
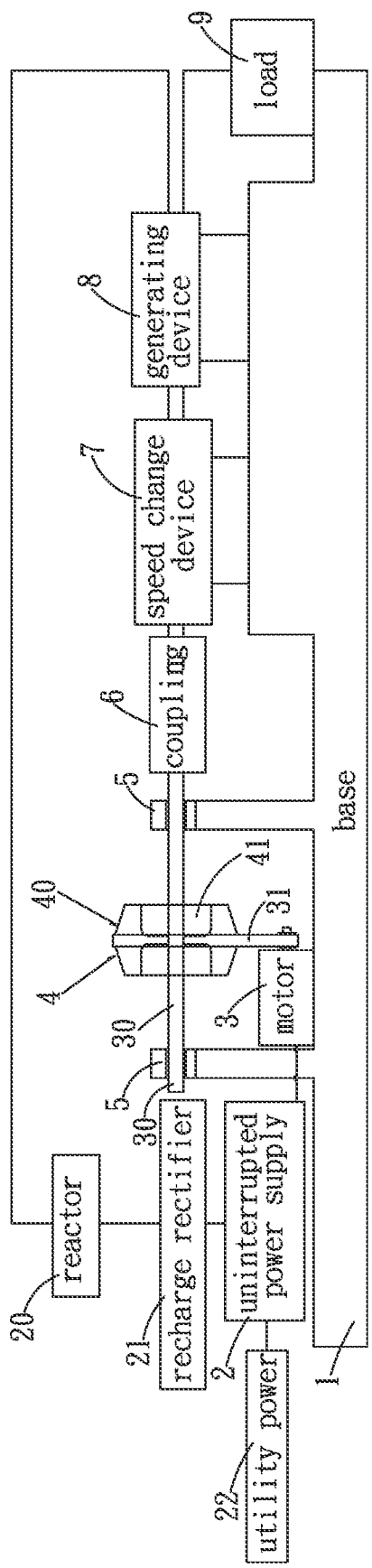
FIG. 1 is a schematic view of a power system in accordance with the preferred embodiment of the present invention.
Figure 2:
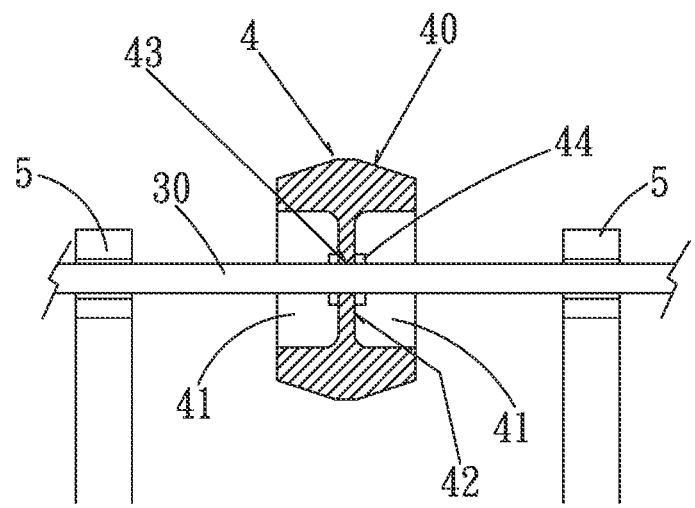
FIG. 2 is a partial cross-sectional view of the power system in accordance with the preferred embodiment of the present invention.

Referring to FIGS. 1 and 2, a power system in accordance with the preferred embodiment of the present invention comprises a base (or mounting seat or engine bed or housing) 1, two magnetic bearings 5 mounted on the base 1, a shaft 30 rotatably mounted on the two magnetic bearings 5, a flywheel (or freewheel) 4 mounted on the shaft 30, a motor 3 connected with the flywheel 4, an uninterrupted power supply 2 electrically connected with the motor 3, a utility power 22 electrically connected with the uninterrupted power supply 2, a coupling (or coupler) 6 connected with the shaft 30, a speed change device (or change gear) 7 connected with the coupling 6, a generating device (or generator) 8 connected with the speed change device 7, a load 9 electrically connected with the generating device 8, a recharge rectifier 21 electrically connected with the uninterrupted power supply 2, and a reactor 20 electrically connected with the recharge rectifier 21 and the generating device 8.

The base 1 is used to receive and support all of the parts of the power system.

The uninterrupted power supply 2 provides an electric power to the motor 3.

The utility power 22 provides a supplemental (or spare) power to the uninterrupted power supply 2 when the electric power of the uninterrupted power supply 2 is not enough or exhausted.

The motor 3 includes a propeller mandrel and a belt 31 mounted on the propeller mandrel and the flywheel 4. Thus, the motor 3 drives and rotates the flywheel 4 successively by the belt 31. Alternatively, the motor 3 directly drives and rotates the flywheel 4 by gears.

The shaft 30 has two ends extending through the two magnetic bearings 5 respectively. One of the two ends of the shaft 30 is connected with the coupling 6 which is connected between the shaft 30 and the speed change device 7.

The flywheel 4 has a periphery provided with a conic portion 40. The conic portion 40 of the flywheel 4 has a dimension reduced from a center toward two sides of the conic portion 40 gradually and symmetrically. The flywheel 4 has an interior provided with two concave portions 41 which are arranged symmetrically. The two concave portions 41 are used to increase the inertia force of the flywheel 4. The flywheel 4 is provided with a fixed portion 42 secured on the shaft 30. The fixed portion 42 of the flywheel 4 is arranged between the two concave portions 41. The fixed portion 42 of the flywheel 4 has a center provided with a through hole (or fixed hole) 43 allowing passage of the shaft 30. Thus, the flywheel 4 is combined with the shaft 30 so that the shaft 30 is rotated successively by the inertia force produced by the flywheel 4. In practice, the flywheel 4 produces an enlarged torque to provide an inertia power.

The power system further comprises two fastening (or securing) members 44 mounted on the fixed portion 42 of the flywheel 4 and secured on the shaft 30 to secure or affix the fixed portion 42 of the flywheel 4 to the shaft 30. The fixed portion 42 of the flywheel 4 is arranged between the two fastening members 44. Preferably, each of the two fastening members 44 is a flange.

The speed change device 7 includes a stepless transmission case (or gearbox) that successively regulates a predetermined rotational force and a predetermined torque and outputs and delivers the rotational force and the torque to the generating device 8.

The generating device 8 uses the rotational force and the torque from the speed change device 7 to generate an electric energy. In practice, the rotational force and the torque from the speed change device 7 produce an inertia power which is supplied by the enlarged torque from the flywheel 4, and the generating device 8 uses the inertia power to generate the electric energy to increase a generating power of the generating device 8.

The load 9 is a power machinery, a powered vehicle, a storage battery or the like. Thus, the inertia power supplied by the enlarged torque of the flywheel 4 is used to generate the electric energy so as to increase the generating power of the generating device 8, and partial of the electric energy of the generating device 8 is supplied to the load 9.

The recharge rectifier 21 is connected between the uninterrupted power supply 2 and the reactor 20. The recharge rectifier 21 delivers partial of the electric energy from the generating device 8 into the uninterrupted power supply 2 so that the uninterrupted power supply 2 cooperates with the utility power 22 to provide the electric power to the motor 3 for rotating the flywheel 4 and the shaft 30.

Each of the two magnetic bearings 5 is a non-contact high-performance bearing that is manufactured by using the principle of mutual repulsion of two same poles of a magnet. In comparison with the traditional ball bearings, sliding bearings, and oil film bearings, the shaft 30 levitates in the magnetic field produced by each of the two magnetic bearings 5, and is constantly located at the center due to the rapid change of the magnetic field. Thus, the shaft 30 is not in mechanic contact with the two magnetic bearings 5 so that the shaft 30 is rotated at a high speed, with the advantages of small mechanical wear, low energy consumption, low noise, long lifetime, no need for lubrication, no oil pollution, etc.

The reactor 20 is connected between the recharge rectifier 21 and the generating device 8. When the generating device 8 produces a short circuit, a large short-circuit current is generated. Thus, the generating device 8 is serially connected with the reactor 20 to increase an impedance of the short circuit, and to limit the short-circuit current. In such a manner, the reactor 20 has a relatively larger voltage drop when the short circuit happens or occurs, to keep the voltage level, so that the voltage fluctuation is less, to ensure stability of operation of the power system.

In conclusion, the enlarged torque of the flywheel 4 provides the inertia power to enhance the generating power of the generating device 8 so that the electric energy of the generating device 8 is supplied to and used by the load 9. In addition, the uninterrupted power supply 2 cooperates with the utility power 22 to provide the electric power to the motor 3 for rotating the flywheel 4 and the shaft 30 so that the load 9 is operated successively.

Accordingly, the power system provides an electric energy to drive the motor 3 which cooperates with the inertia power from the flywheel 4 to generate en electric power. In addition, the power system uses an inertia force to generate an electric energy and provide the electric energy to the load 9 so that the electric energy is clean, successive, and steady without causing any pollution. Further, the recharge rectifier 21 delivers and feeds the electric energy from the generating device 8 into the uninterrupted power supply 2 so that the uninterrupted power supply 2 provides the electric power to the motor 3 for rotating the flywheel 4 and the shaft 30 to keep the power system operating successively. Further, the power system achieves an energy-saving purpose. Further, the utility power 22 provides an auxiliary power to the uninterrupted power supply 2 when the electric power of the uninterrupted power supply 2 is not enough or exhausted so that the uninterrupted power supply 2 provides the electric power to the motor 3 steadily and constantly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A power system comprising:
a base;
two magnetic bearings mounted on the base;

a shaft rotatably mounted on the two magnetic bearings;
a flywheel mounted on the shaft;
a motor connected with the flywheel;
an uninterrupted power supply electrically connected with the motor;
a utility power electrically connected with the uninterrupted power supply;
a coupling connected with the shaft;
a speed change device connected with the coupling;
a generating device connected with the speed change device;
a load electrically connected with the generating device;
a recharge rectifier electrically connected with the uninterrupted power supply; and
a reactor electrically connected with the recharge rectifier and the generating device;
wherein:
the uninterrupted power supply provides an electric power to the motor;
the motor drives and rotates the flywheel successively;
the flywheel has a periphery provided with a conic portion;
the conic portion of the flywheel has a dimension reduced from a center toward two sides of the conic portion symmetrically;
the flywheel has an interior provided with two concave portions which are arranged symmetrically;
the flywheel is provided with a fixed portion secured on the shaft;
the fixed portion of the flywheel is arranged between the two concave portions;
the fixed portion of the flywheel has a center provided with a through hole allowing passage of the shaft;
the shaft is rotated successively by the inertia force produced by the flywheel;
the power system further comprises two fastening members mounted on the fixed portion of the flywheel and secured on the shaft to secure the fixed portion of the flywheel to the shaft;
the recharge rectifier delivers an electric energy from the generating device into the uninterrupted power supply so that the uninterrupted power supply provides the electric power to the motor for rotating the flywheel.

2. The power system as claimed in claim 1, wherein the shaft has two ends extending through the two magnetic bearings respectively.

3. The power system as claimed in claim 1, wherein:
the speed change device includes a stepless transmission case that successively regulates a predetermined rotational force and torque and outputs the rotational force and torque to the generating device;
the generating device uses the rotational force and torque from the speed change device to generate the electric energy;
the rotational force and the torque from the speed change device produce an inertia power which is supplied by the enlarged torque from the flywheel; and
the generating device uses the inertia power to generate the electric energy to increase a generating power of the generating device.

* * * * *